(12) United States Patent
Brown et al.

(10) Patent No.: US 7,533,331 B2
(45) Date of Patent: May 12, 2009

(54) SYSTEM AND METHOD FOR SECURELY ADDING REDUNDANCY TO AN ELECTRONIC MESSAGE

(75) Inventors: Michael K. Brown, Kitchener (CA); Michael G. Kirkup, Waterloo (CA); Michael S. Brown, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 454 days.

(21) Appl. No.: 11/059,676

(22) Filed: Feb. 17, 2005

(65) Prior Publication Data

US 2006/0123313 A1 Jun. 8, 2006

(51) Int. Cl.
*H03M 13/09* (2006.01)
(52) U.S. Cl. ...................... 714/807; 713/176
(58) Field of Classification Search .............. 714/807; 713/176
See application file for complete search history.

(56) References Cited

U.S. PATENT DOCUMENTS

| | | | |
|---|---|---|---|
| 6,880,149 B2 * | 4/2005 | Cronce | 717/126 |
| 7,080,257 B1 * | 7/2006 | Jakubowski et al. | 713/187 |
| 7,243,226 B2 * | 7/2007 | Newcombe et al. | 713/155 |
| 2003/0056118 A1 | 3/2003 | Troyansky et al. | |
| 2005/0047591 A1 * | 3/2005 | Liang | 380/28 |

FOREIGN PATENT DOCUMENTS

EP 1313245 A1 5/2003

OTHER PUBLICATIONS

Wright A. K. et al.: "Low-latency cryptographic protection for SCADA communications", The Institution of Electrical Engineers, Stevenage GB; 2004, Database accession #8001859.

* cited by examiner

*Primary Examiner*—Stephen M Baker
(74) *Attorney, Agent, or Firm*—Dimock Stratton LLP; Jenna L. Wilson

(57) ABSTRACT

A system for adding a redundancy check to an electronic message to discourage tampering and facilitate identification of altered messages provides a communication device for composing message content, a messaging module with a formatting and encoding layer for encoding the message content with header information in a series of message blocks, and an encryption layer for calculating a redundancy check value and inserting the value in one or more locations within the series of message blocks according a rule defined by a characteristic of the message content or the header information, and encrypting the message for delivery to a recipient. Upon receipt, the recipient communication device decrypts the message, extracts the redundancy check value from the message, and compares a calculated redundancy check value with the extracted redundancy check value to determine if the message had been altered before receipt.

16 Claims, 4 Drawing Sheets

SYSTEM AND METHOD FOR SECURELY ADDING REDUNDANCY TO AN ELECTRONIC MESSAGE

FIELD OF THE INVENTION

This invention relates generally to electronic messaging, and more specifically to a method for detecting tampering with an electronic message.

BACKGROUND OF THE INVENTION

There are known redundancy techniques for guarding against malicious alterations of electronic message files such as electronic mail. A common method employed to determine whether a message has been altered in transit between the sender and recipient is to add message redundancy to the message file. Such redundancy may take the form of a cyclic redundancy check (CRC) or a hash of the message. In such systems, prior to transmission of the message from the sender's communication device, an encoder calculates a CRC or hash value based on the content of the message, and appends this value to the end of the message file. The message, together with the hash value, is then encrypted. The encrypted message with the appended CRC or hash value is then transmitted via a wireless or fixed-link network to the recipient's communication device.

When the message is received by the recipient's communication device, the message is decrypted. The CRC or hash value may then be found by the recipient's communication device at the end of the message. The recipient's communication device is able to calculate a CRC or hash value from the received message content, and then compares the calculated value with the redundancy value that was transmitted with the message. If the values match, then the message file is presumed to have been unaltered before receipt by the recipient's communication device. If the values do not match, then the message is determined to have been deliberately or accidentally altered.

The structure of such electronic message files is static; in other words, it is generally known that redundancy measures such as those described above append the CRC or hash value at the end of the message file. It is therefore possible for a party intercepting an electronic message before it is received by the message recipient to locate the redundancy value at the end of the intercepted message content. Once the redundancy value is located, an intercepting party may maliciously alter the content of the message while preserving the redundancy value. Alternatively, an intercepting party may alter the content of the message, recalculate the redundancy value, and replace the old hash value with the newly recalculated value. In such a case, the redundancy technique is rendered ineffective as the recipient is therefore unable to determine from the redundancy value comparison that the message has been tampered with when it is finally received by the recipient's communication device.

Accordingly, it is desirable to provide a method for adding redundancy checks to an electronic message such that deliberate tampering is discouraged, and is easier to detect.

SUMMARY OF THE INVENTION

According to one aspect of the invention, a method is provided for a sending communication device to provide redundancy to an electronic message to be sent to a recipient communication device, the method comprising the steps of determining a redundancy value for the electronic message to be sent, determining a locating value, the locating value being defined such that the value varies for different electronic messages and being defined such that the locating value may be determined by the recipient communication device for each electronic message sent to it, placing the redundancy value in the electronic message at one or more locations determined by the locating value, and encrypting the electronic message including the redundancy value. In a further aspect of the invention, prior to the step of placing the redundancy value in the electronic message at one or more locations determined by the locating value, the electronic message is formatted as a series of message blocks, and formatting the redundancy value as one or more redundancy value blocks. A further aspect is that the step of determining a locating value comprises the step of determining the value of a characteristic of the electronic message. Yet another aspect is that the step of encrypting the electronic message including the redundancy value comprises the step of assigning a session key to the electronic message. In various embodiments of the invention, the step of determining the value of a characteristic of the electronic message may comprise the step of determining the number of bits of a predetermined value in the session key, or the step of determining the value of a characteristic of the electronic message further comprises the step of determining the parity of the number of bits.

In another aspect of the invention, the step of placing the redundancy value in the electronic message at one or more locations determined by the locating value comprises the steps of selecting a message block from the series of message blocks based on the locating value, and inserting at least one of the one or more redundancy value blocks in a location defined in relation to the selected message block, and optionally that the step of determining a locating value comprises the step of determining the value of a characteristic of one or more predetermined message blocks.

Yet another aspect of the invention provides a communication device for sending a message to a recipient communication device, comprising program code operative to define a message; program code operative to determine a redundancy value for the message; program code operative to determine a locating value, the locating value being defined such that the value varies for different messages and being defined such that the locating value may be determined by the recipient communication device for each message sent to it; program code operative to place the redundancy value in the message at one or more locations determined by the locating value; and program code operative to encrypt the message including the redundancy value. In further aspects, the locating value is the value of a selected characteristic of the message. In another aspect, the program code is also operative to encrypt the message using a session key, and the selected characteristic of the message may be the number of bits of a predetermined value in the session key or the parity of the number of bits of a predetermined value in the session key.

In a further aspect, the communication device further comprises program code operative to format the message as a series of message blocks and program code operative to format the redundancy value as one or more redundancy value blocks, such that the program code operative to place the redundancy value in the message at one or more locations determined by the locating value is operative to identify one of the series of message blocks, and then insert at least one of the one or more redundancy value blocks in a location defined in relation to the identified one of the series of message blocks. In another aspect, the program code is also operative to encrypt the message using a session key, or operative to derive a value from a characteristic of a specified block in the series of message blocks as the locating value, locate an identified message block based on the locating value, and insert at least one of the one or more redundancy value blocks in a location defined in relation to the identified message block.

Yet another aspect of the invention provides a communication device for decrypting an encrypted message, the message comprising a plurality of message blocks and one or more redundancy value blocks placed among the plurality of message blocks according to a locating value, the locating value being defined such that the locating value varies for different messages, the communication device comprising program code operative to decrypt the encrypted message, program code operative to locate the one or more redundancy value blocks in the message based on the locating value, program code operative to obtain a received redundancy value from the one or more redundancy value blocks, program code operative to determine a calculated redundancy value from the plurality of message blocks, and program code operative to compare the received redundancy value with the calculated redundancy value.

In a further aspect of the invention, the communication device is provided with program code operative to locate the one or more redundancy value blocks in the message based on the locating value comprising code to determine or receive the locating value, identify one of the plurality of message blocks using the locating value, and identify the location of at least one of the one or more redundancy value blocks in relation to the location of the identified one of the plurality of message blocks within the message.

In a still further aspect of the invention, a method is provided for determining the reliability of a received encrypted message, the message comprising a plurality of message blocks and one or more redundancy value blocks placed among the plurality of message blocks according to a locating value, the locating value being defined such that the locating value varies for different messages, the method comprising the steps of decrypting the encrypted message to obtain a message; locating the one or more redundancy value blocks in the message based on the locating value; obtaining a received redundancy value from the one or more redundancy value blocks; determining a calculated redundancy value from the plurality of message blocks; comparing the received redundancy value with the calculated redundancy value; and determining that the message is not reliable if the received redundancy value and the calculated redundancy check value are not equal.

In a further aspect, method further comprises the steps of identifying one of the plurality of message blocks using the locating value; and identifying the location of at least one of the one or more redundancy value blocks in relation to the location of the identified one of the plurality of message blocks within the message.

In still a further aspect of the invention, a communication device is provided for sending a message to a recipient device over a network, the communication device comprising a processor, a memory, an interface to allow input of a message, a network connection, a messaging module operably connected with the processor and the memory to receive message input using the interface, the messaging module being configured to format the message as a series of message blocks, calculate a redundancy value from the message and format the redundancy value into at least one redundancy value block, determine a locating value such that the locating value varies for different messages and may be determined by the recipient device for each message sent to it, placing the at least one redundancy value block in the series of message blocks according to a predetermined rule based on the locating value, and encrypt the message blocks and the at least one redundancy value block placed therein to provide an encrypted message, and transmit the encrypted message over the network connection.

BRIEF DESCRIPTION OF THE DRAWINGS

In drawings which illustrate by way of example only a preferred embodiment of the invention.

DETAILED DESCRIPTION OF THE INVENTION

Figure 1:
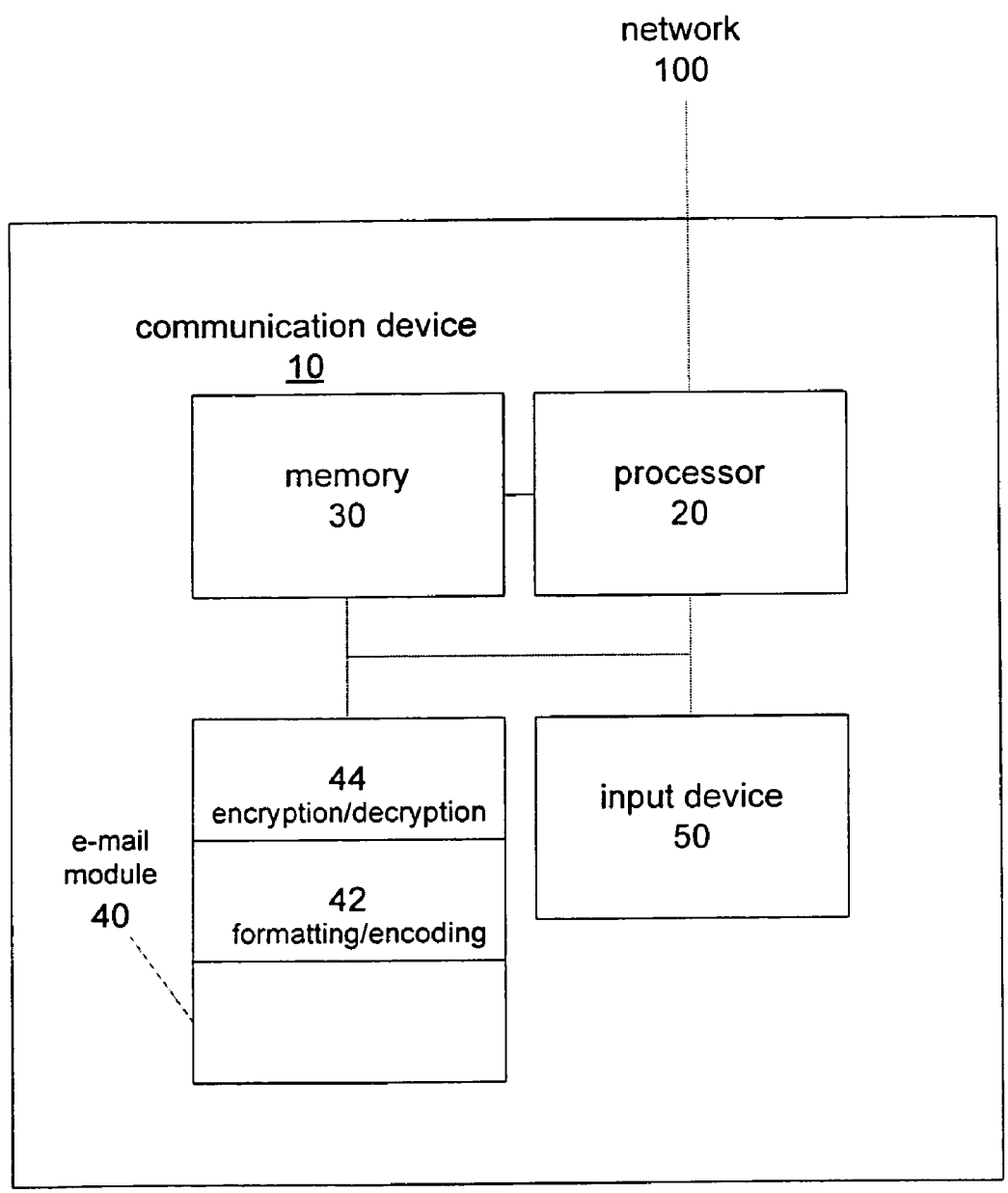
FIG. 1 is a block diagram of a system for securely adding redundancy to an electronic message.

Referring to FIG. 1, a communication device 10 is provided. The communication device 10 is provided with a processor 20, memory 30, an e-mail module 40, and an input device 50. The communication device 10 may be a personal computer, personal digital assistant, wireless mobile communication device or the like.

The communication device 10 is provided with an operating system and other elements known in the art used for the operation and control of the communication device, which are used in conjunction with the processor 20 and the memory 30. The memory 30 may include random-access memory for temporary storage of messages composed by the user of the communication device 10. The input device 50 may be a keyboard, touch-sensitive screen, or other suitable data entry device for the user of the communication device 10 for providing commands and entering data into the device 10. The communication device 10 is connected to a wide-area network 100 via a connection that may comprise a wireless gateway or a fixed link.

The e-mail module 40 is preferably provided as application software that is executable on the operating system of the communication device 10. E-mail module 40 receives instructions and data from the user via the input device 50. The data may include the content of an e-mail message to be sent, as well as the e-mail address of the intended recipient. Instructions may include the command to "send" the e-mail to the intended recipient, or another command by which the user indicates to the module 40 that composition of the message content is complete.

In the preferred embodiment, as shown in FIG. 1, e-mail module 40 includes program code executable on communications device defining a formatting/encoding layer 42 and program code defining an encryption/decryption layer 44. When a user has defined an e-mail message and issues the send command, the program code in the formatting/encoding layer 42 executes to format and encode the e-mail message. In the preferred embodiment the encoding results in the defined e-mail message being placed in a commonly recognized format for electronic mail correspondence.

Figure 2A:
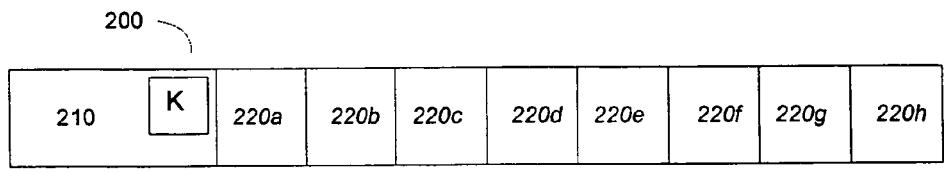
FIG. 2a is a block diagram of a message created by the system of FIG. 1 prior to the secure addition of redundancy.

According to the preferred embodiment, shown in FIG. 2a, the formatted and encoded message 200 comprises a number of blocks. Block 210 comprises header information, which may include data such as the recipient's address, a subject line, a date and timestamp, and an encryption or session key K assigned to the message by the e-mail module 40, in accordance with techniques known in the art. Blocks 220a . . . h contain the content of the message. It will be understood by those skilled in the art that the format of the e-mail message is not required to be defined by blocks or to include the information set out in the example of the preferred embodiment. However, to permit e-mail messages to be widely used, the general format set out is typically used.

After formatting and encoding have taken place, message 200 is then passed to executing program code in the encryption/decryption layer 44. Preferably, the formatted and encoded message 200 is stored in the memory 30 of the communication device 10, and the formatting/encoding layer 42 passes a pointer to the memory location of the formatted and encoded message 200 to the encryption/decryption layer 44.

The encryption/decryption layer 44 accesses the formatted and encoded message 200, and calculates a redundancy check value based on the content of the message blocks 220a . . . h, such as a hash or CRC value, in accordance with techniques known in the art. The encryption/decryption layer 44 encodes the redundancy check value into one or more blocks, and inserts these blocks into blocks of the formatted and encoded message, according to the method described below. After the redundancy check value is inserted into the message 200, the encryption/decryption layer 44 encrypts the message 200, including the blocks having the value of the redundancy check (using session key K). The encrypted message is then made available to be transmitted to the network 100 by the e-mail module 40 for receipt by the recipient communication device.

Figure 2B:
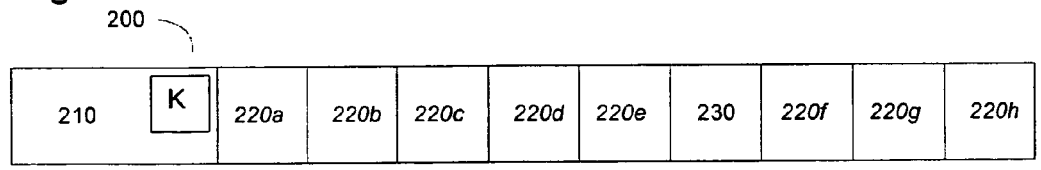
FIGS. 2b, 2c, and 2d are block diagrams of messages created by the system of FIG. 1 after the secure addition of redundancy.

Referring to FIG. 2b, in a preferred embodiment, the encryption/decryption layer 44 carries out a calculation to specify the location or locations in the message where the redundancy value blocks will be inserted. In accordance with the preferred embodiment, the location of the redundancy values is not uniformly defined to be at the end of the message content blocks. Rather, the location is specified by variable values. In the example relating to FIG. 2b, the location or locations are specified based on the content of the message 200, itself. For example, the encryption/decryption layer 44 inspects the first block of the message 220a to determine the number of 1s or 0s contained therein. If, in the example of FIG. 2a, the block 220a contains five 1s, the encryption/decryption layer 44 inserts a single block 230 containing the redundancy value between the fifth and sixth blocks 220e and 220f of the message 200, as shown in FIG. 2b.

Figure 2C:
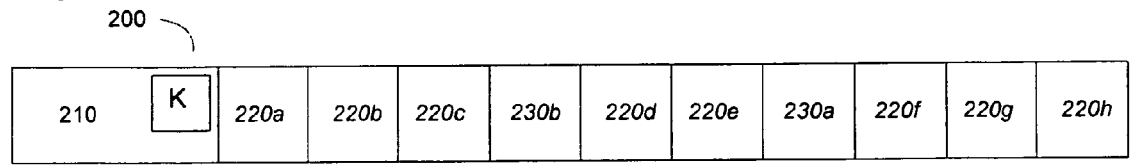

More preferably, the redundancy value is split into a plurality of blocks to further obfuscate the location of the redundancy within the message 200. If the redundancy value is to be split between two blocks 230a and 230b, the encryption/decryption layer 44 inspects a plurality of blocks of the message, for example the first and second blocks 220a and 220b. If, in the example of FIG. 2a, the second block 220b contains three 1s, the encryption/decryption layer 44 inserts the first redundancy value block 230a between the fifth and sixth blocks 220e and 220f of the message 200, and the second redundancy block 230b between the third and fourth blocks 220c and 220d, as shown in FIG. 2c.

In a most preferred embodiment, the location of the blocks containing the redundancy value is determined by the value of the session key K. The encryption/decryption layer 44 counts the number of 0s appearing in the binary representation of the value of session key K. If this number is even, then the first redundancy value block 230a is placed between first and second blocks 220a and 220b of the message 200. If this number is odd, then the first redundancy value 230a is placed between the second and third blocks 220b and 220c of the message 200.

Figure 2D:
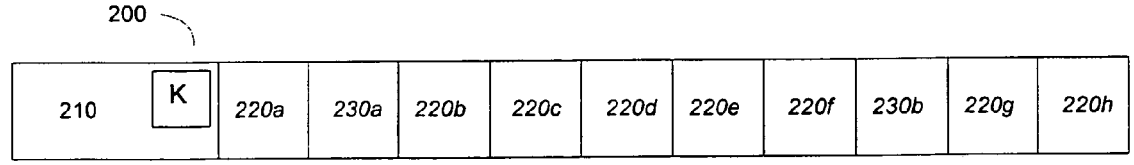

Further, if the key value is divisible by four, then the encryption/decryption layer 44 places the second redundancy value block 230b between the fifth and sixth blocks 220e and 220f of the message 200; otherwise, the second redundancy value block 230b is placed between the sixth and seventh blocks 220f and 220g of the message 200. The resultant arrangement of blocks in the message 200 in this embodiment is shown in FIG. 2d in an example where the number of 0s in K is 6, and K is an even number that is not a multiple of 4. This method of determining the locations of the redundancy value blocks 230a, b is most preferred as the total message length of the message 200 may be short; if the locations of the redundancy blocks were determined principally based on a high number of 1s or 0s appearing in the session key or a message block 220, for example, the encryption/decryption layer 44 might attempt to place a redundancy value block 230 between two message blocks 220 that did not actually exist, resulting in an error condition.

When an encrypted message with redundancy thus added is received from a sender over the network 100 by the e-mail module 40 of the recipient's communication device 10, the encrypted message is passed to the encryption/decryption layer 44, which first decrypts the message 200. The encryption/decryption layer 44 operates to extract the redundancy blocks 230a,b from the message 200 to determine the redundancy check value.

As a person skilled in the art will understand, the extraction of redundancy blocks by recipient's communication device is defined in a way that matches the way that sender's communication device 10 inserts such blocks. The recipient's communication device is therefore provided with sufficient information to determine the locations of the redundancy value blocks 230a,b. Thus, for example, if the sender's communication device 10 is configured to evaluate the number of 1s in the first block 220a of the message in order to determine the location of a redundancy block 230a, then the receiver's communication device 10 is likewise configured to evaluate the number of 1s in the first block 220a of the received message. The necessary information may be transmitted from the sender to the recipient separately from the encrypted message; however, if the information used to determine the locations of the redundancy value blocks 230a,b is the session key K, a portion of the information necessary to locate the redundancy value blocks 230a,b is thus transmitted along with the encrypted message.

Figure 2E:
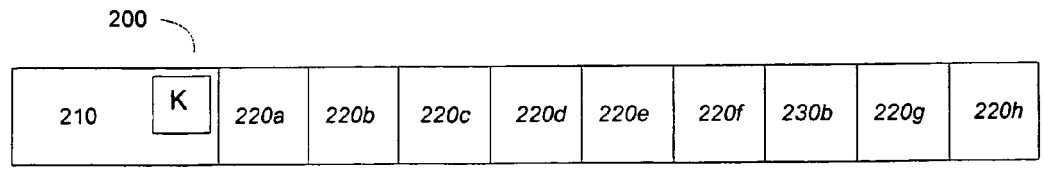
FIG. 2e is a block diagram of the message of FIG. 2d after the extraction of a redundancy block.

For example, where the receiver's communication device 10 receives the encrypted version of the message 200 depicted in FIG. 2d and is configured to use the session key K to determine the location of the redundancy value blocks 230a,b, the encryption/decryption layer 44 in the receiving device 10 first decrypts the message to arrive at the message 200 shown in FIG. 2d. The encryption/decryption layer 44 next examines the session key K and determines that there were six 0s contained in the session key K. As six is an even number, the first redundancy value block 230a is extracted from the message 200 from between the first and second blocks 220a, 220b, as shown in FIG. 2e. The message 200 is then temporarily stored in the memory 30 of the receiver's communication device 10. Next, the encryption/decryption layer 44 determines that the number of 0s in the session key, six, is not divisible by four, and therefore extracts the second redundancy block 230b from between the sixth and seventh blocks 220f,g. The contents of the redundancy blocks 230a,b are then assembled to generate an extracted redundancy value $R_E$.

The encryption/decryption layer 44 in the receiving device 10 then computes its own redundancy value $R_C$ based on the content of the message blocks 220a . . . h, and compares this $R_C$ to $R_E$. If the values match, then the receiving device 10 determines the message to be unaltered. If the values do not match, then the message is determined to have been altered, and preferably a warning is provided to the recipient.

As a person skilled in the art will appreciate, the means of determining the location of the n redundancy value blocks 230a . . . h is not restricted to an evaluation of the content of the first n blocks of the message 200 or the session key K. Other suitable and variable characteristics of message content, for example message length, may be used to establish the location of the redundancy value blocks 230a . . . h. Alternatively, another parameter that is not dependent on the message content may be used to determine the location of the redundancy block or blocks 230a . . . h. Provided that the communication devices 10 of each of the sender and the intended recipient of the message are provided with the same means for determining the locations of the redundancy blocks 230a . . . h of the message 200, such other means may be used, although most preferably the locations generated by these means can potentially vary from message to message.

Thus, for example, a look-up table or database, which may be populated with values determined using a pseudo-random number generator, can reside on a mail server on the network 100, accessible to both the sender's and recipient's communication devices. When a message is passed to the encryption/decryption layer 44 of the sender's communication device 10, the sender's device 10 then queries the database for a value to be used in determining the locations of the redundancy blocks 230a . . . h. This value may be transmitted to the recipient's communication device 10 together with the message, or alternatively pointer information may be transmitted to the recipient's communication device 10. This pointer information may comprise the timestamp of the message, which is correlated with the value stored in the database once the message is transmitted. When the recipient's communication device 10 receives the message 200, the recipient's device 10 can then retrieve the pseudo-random number from the database.

Figure 3:
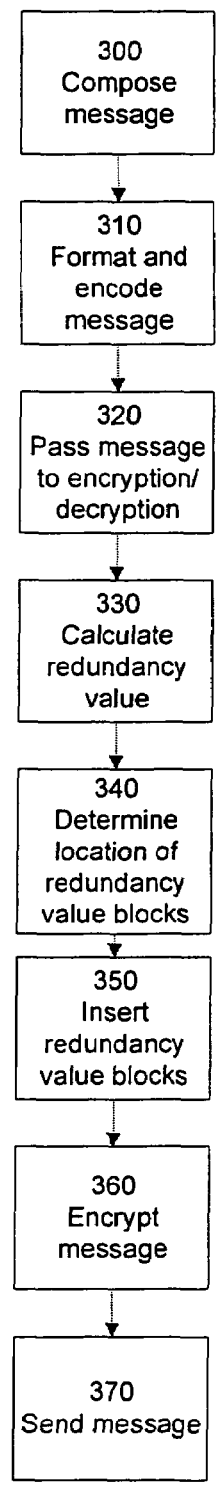
FIG. 3 is a flow diagram showing a method for securely adding redundancy to an electronic message.

Referring to FIG. 3, a method of securely adding message redundancy to an electronic message is shown according to a preferred embodiment. At step 300, a message composed by a user is received by the e-mail module 40 of a communication device 10. The message is then formatted and encoded by the formatting/encoding layer 42 at step 310, then passed to the encryption/decryption layer 44 of the module 40 at step 320.

At step 330, the encryption/decryption layer 44 calculates a redundancy value and encodes it into one or more blocks. At step 340, the encryption/decryption layer 44 determines one or more locations for placing the blocks containing the redundancy value. At step 350, the redundancy value blocks are inserted within the message, then the message is encrypted at step 360. Finally, at step 370, the message is dispatched to the recipient.

Figure 4:
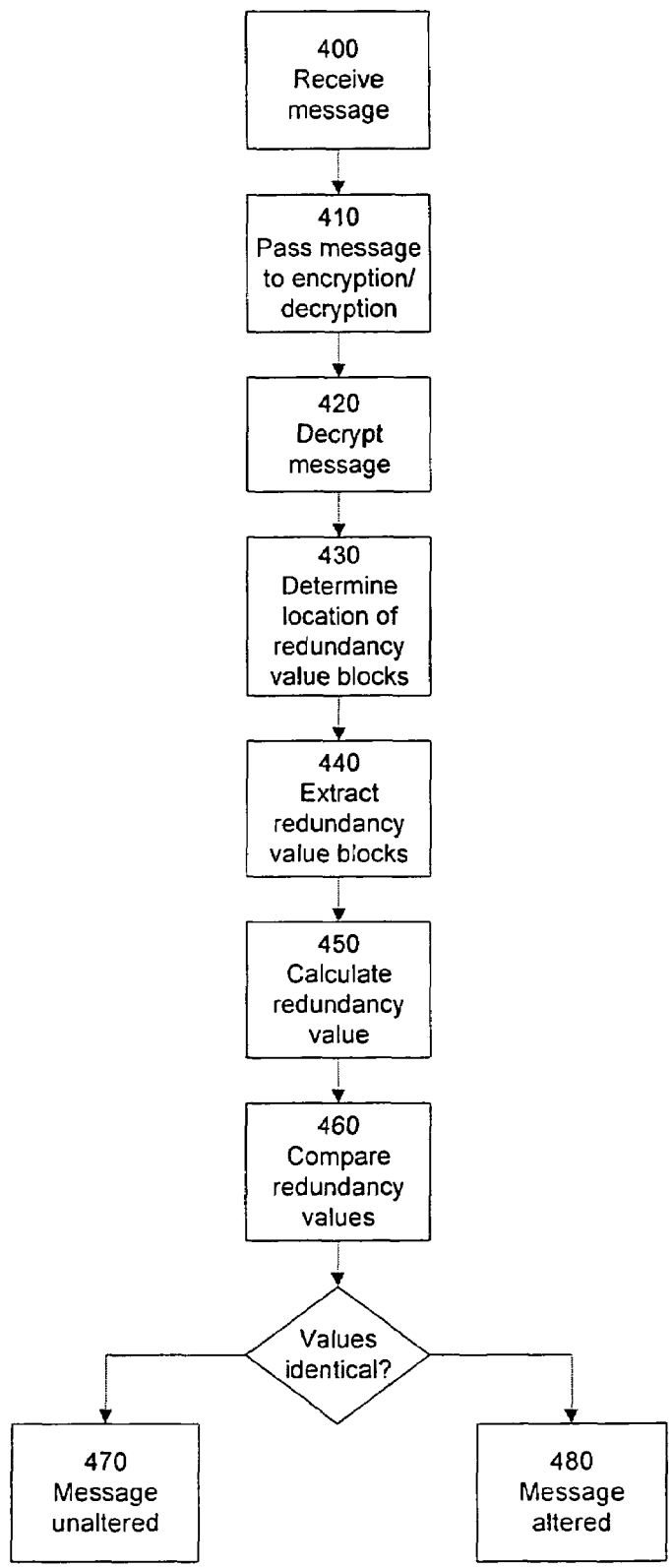
FIG. 4 is a flow diagram showing a method for performing a redundancy check upon receipt of an electronic message.

The method of decrypting a received message and determining whether the message has been altered before reception by the intended recipient is shown in FIG. 4. At step 400, a message is received by a communication device 10 over a network 100. The message is passed to the encryption/decryption layer 44 of the e-mail module 40 within the device 10 at step 410. The encryption/decryption layer 44 decrypts the message at step 420, then determines the locations of the redundancy value blocks at step 430. At step 440, the redundancy value blocks are extracted from the message and assembled to produce the extracted redundancy value $R_E$. A calculated redundancy value, $R_C$, is then determined from the content of the message at step 450, and the values $R_C$ and $R_E$ are compared at step 460. If the values match, then the message is determined to be unaltered, 470; otherwise, it is determined to have been altered, and preferably a warning is issued to the recipient at 480.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A method for a sending communication device to provide redundancy to an electronic message to be sent to a recipient communication device, the method comprising:
    assigning a session key to the electronic message,
    determining a redundancy value for the electronic message,
    determining a locating value, the locating value comprising a value of a characteristic of the electronic message and being defined such that the locating value varies for different electronic messages and may be determined by the recipient communication device for each electronic message sent to it,
    placing the redundancy value in the electronic message at one or more locations determined by the locating value, and
    encrypting the electronic message including the redundancy value,
    wherein the value of the characteristic of the electronic message comprises a number of bits of a predetermined value in the session key.

2. The method of claim 1 wherein the value of the characteristic of the electronic message comprises a parity of the number of bits.

3. The method of claim 1 further comprising, prior to placing the redundancy value in the electronic message at one or more locations determined by the locating value:
    formatting the electronic message as a series of message blocks, and formatting the redundancy value as one or more redundancy value blocks.

4. The method of claim 3 wherein placing the redundancy value in the electronic message at one or more locations determined by the locating value comprises selecting a message block from the series of message blocks based on the locating value, and inserting at least one of the one or more redundancy value blocks in a location defined in relation to the selected message block.

5. A method for a sending communication device to provide redundancy to an electronic message to be sent to a recipient communication device, the method comprising:
    determining a redundancy value for the electronic message to be sent,
    formatting the electronic message as a series of message blocks, and formatting the redundancy value as one or more redundancy value blocks,
    determining a locating value, the locating value comprising a value of a characteristic of one or more predetermined message blocks and being defined such that the locating value varies for different electronic messages and may be determined by the recipient communication device for each electronic message sent to it, placing the redundancy value in the electronic message at one or more locations determined by the locating value, and encrypting the electronic message including the redundancy value.

6. A communication device for sending a message to a recipient communication device, comprising:
program code operative to define the message;
program code operative to determine a redundancy value for the message;
program code operative to determine a locating value, the locating value being defined such that the value varies for different messages and being defined such that the locating value may be determined by the recipient communication device for each message sent to it;
program code operative to place the redundancy value in the message at one or more locations determined by the locating value; and
program code operative to encrypt the message including the redundancy value,
wherein the locating value is the value of a selected characteristic of the message.

7. The communication device of claim 6 wherein the program code operative to encrypt the message including the redundancy value is operative to encrypt the message using a session key.

8. The communication device of claim 7 wherein the selected characteristic of the message is a number of bits of a predetermined value in the session key.

9. The communication device of claim 7 wherein the selected characteristic of the message is the parity of a number of bits of a predetermined value in the session key.

10. The communication device of claim 6 further comprising:
program code operative to format the message as a series of message blocks; and
program code operative to format the redundancy value as one or more redundancy value blocks,
such that the program code operative to place the redundancy value in the message at one or more locations determined by the locating value is operative to identify one of the series of message blocks, and then insert at least one of the one or more redundancy value blocks in a location defined in relation to the identified one of the series of message blocks.

11. The communication device of claim 10 wherein the program code is operative to encrypt the message including the redundancy value is operative to encrypt the message using a session key.

12. A communication device for sending a message to a recipient communication device, comprising:
program code operative to define the message;
program code operative to format the message as a series of message blocks;
program code operative to determine a redundancy value for the message;
program code operative to format the redundancy value as one or more redundancy value blocks;
program code operative to determine a locating value, the locating value being defined such that the locating value varies for different messages and such that the locating value may be determined by the recipient communication device for each message sent to it, wherein the locating value is a number of bits of a predetermined value in a session key;
program code operative to place the redundancy value in the message at one or more locations determined by the locating value by:
identifying one of the series of message blocks, and
inserting at least one of the one or more redundancy value blocks in a location defined in relation to the identified one of the series of message blocks; and
program code operative to encrypt the message including the redundancy value using the session key.

13. A communication device for sending a message to a recipient communication device, comprising:
program code operative to define the message;
program code operative to format the message as a series of message blocks;
program code operative to determine a redundancy value for the message;
program code operative to format the redundancy value as one or more redundancy value blocks;
program code operative to determine a locating value, the locating value being defined such that the locating value varies for different messages and such that the locating value may be determined by the recipient communication device for each message sent to it, wherein the locating value is a parity of a number of bits of a predetermined value in a session key;
program code operative to place the redundancy value in the message at one or more locations determined by the locating value by:
identifying one of the series of message blocks, and
inserting at least one of the one or more redundancy value blocks in a location defined in relation to the identified one of the series of message blocks; and
program code operative to encrypt the message including the redundancy value using the session key.

14. A communication device for sending a message to a recipient communication device, comprising:
program code operative to define the message;
program code operative to format the message as a series of message blocks;
program code operative to determine a redundancy value for the message;
program code operative to format the redundancy value as one or more redundancy value blocks;
program code operative to determine a locating value derived from a characteristic of a specified block in the series of message blocks, the locating value being defined such that the value varies for different messages and being defined such that the locating value may be determined by the recipient communication device for each message sent to it, wherein the characteristic of the specified block is a number of bits of a predetermined value in the specified block;
program code operative to place the redundancy value in the message at one or more locations by identifying one of the series of message blocks based on the locating value and inserting at least one of the one or more redundancy value blocks in a location defined in relation to the identified one of the series of message blocks; and
program code operative to encrypt the message including the redundancy value.

15. A communication device for sending a message to a recipient communication device, comprising:
program code operative to define the message;
program code operative to format the message as a series of message blocks;
program code operative to determine a redundancy value for the message;

program code operative to format the redundancy value as one or more redundancy value blocks;

program code operative to determine a locating value derived from a characteristic of a specified block in the series of message blocks, the locating value being defined such that the value varies for different messages and being defined such that the locating value may be determined by the recipient communication device for each message sent to it, wherein the characteristic of the specified block is a parity of a number of bits of a predetermined value in the specified block;

program code operative to place the redundancy value in the message at one or more locations by identifying one of the series of message blocks based on the locating value and inserting at least one of the one or more redundancy value blocks in a location defined in relation to the identified one of the series of message blocks; and program code operative to encrypt the message including the redundancy value.

16. A communication device for decrypting an encrypted message, the message comprising a plurality of message blocks and one or more redundancy value blocks placed among the plurality of message blocks according to a locating value, the locating value being defined such that the locating value varies for different messages, the communication device comprising:

program code operative to decrypt the encrypted message;

program code operative to locate the one or more redundancy value blocks in the message based on the locating value, comprising:

program code operative to determine or receive the locating value, program code operative to identify one of the plurality of message blocks using the locating value, and program code operative to identify the location of at least one of the one or more redundancy value blocks in relation to the location of the identified one of the plurality of message blocks within the message;

program code operative to obtain a received redundancy value from the one or more redundancy value blocks;

program code operative to determine a calculated redundancy value from the plurality of message blocks; and program code operative to compare the received redundancy value with the calculated redundancy value wherein the locating value is a session key provided with the encrypted message.

\* \* \* \* \*